United States Patent [19]
Farcy et al.

[11] 4,307,350
[45] Dec. 22, 1981

[54] GAS LASER

[75] Inventors: Jean-Claude Farcy, Briis sur Orge; Guy Hélias, Paris, both of France

[73] Assignee: Compagnie Generale d'Electricite, Paris, France

[21] Appl. No.: 118,765

[22] Filed: Feb. 5, 1980

[30] Foreign Application Priority Data

Feb. 16, 1979 [FR] France ................. 79 04011

[51] Int. Cl.³ .................................................. H01S 3/08
[52] U.S. Cl. ........................ 331/94.5 PE; 331/94.5 G
[58] Field of Search ................ 331/94.5 PE, 94.5 G, 331/94.5 C, 94.5 D

[56] References Cited

U.S. PATENT DOCUMENTS 3,740,662 6/1973 Farcy et al. ................. 331/94.5 PE

FOREIGN PATENT DOCUMENTS 2182732 12/1973 France.

*Primary Examiner*—William L. Sikes
*Assistant Examiner*—Léon Scott, Jr.
*Attorney, Agent, or Firm*—Kenyon & Kenyon

[57] ABSTRACT

The gas laser includes in particular a cathode (2) which is substantially cylindrical about an axis (10) parallel with the axis of the laser cavity, said cathode being provided with protrusions (11) formed by grooves in which insulated conductor wires (12) are disposed, said wires being brought to an electric potential which is positive with respect to that of the cathode, and means for rotating the cathode on its axis. Cathode rotation serves to cool the cathode during operation and can also be used to circulate the active gas. Application to welding and to machining.

13 Claims, 5 Drawing Figures

GAS LASER

The present invention relates to gas lasers and in particular to gas lasers which deliver successive pulses at a high repetition frequency.

A gas laser is known which includes an anode and a cathode disposed facing each other; an optical resonant cavity which surrounds the space between the anode and the cathode; and a pumping circuit for circulating an active gas containing carbon dioxide through the space between the anode and the cathode. An electric pulse generator sets up successive electric discharges between the anode and the cathode, the discharges being directed perpendicularly to the axial direction of the resonant cacity. Successive laser pulses are thereby emitted from the cavity. To make the electric discharges more uniform, the cathode usually includes a plurality of protrusions which point towards the anode with an electrically insulated conductor wire being fixed on the cathode between the protrusions, the wire being brought to an electric potential which is positive with repsect to the cathode.

When gas lasers of the above type deliver successive pulses at a high repetition frequency, it is observed that the protrusions heat up considerably. This is a disadvantage, since in practice, it limits the performance of the laser.

The present invention aims to mitigate the above disadvantage and to reduce the heating of the cathode protrusions of the above type of gas laser.

The present invention provides a gas laser which includes:

an anode;

a cathode disposed facing the anode and leaving a space between the anode and the cathode, the cathode including protrusions between which an electrically insulated conductor wire is fixed, said wire being brought to a positive electric potential with respect to the cathode;

means for setting up successive electric discharge between the anode and the cathode; and an optical resonant cavity containing an active gas and situated between the anode and the cathode, the cavity pointing in the direction of a first axis perpendicular to the direction of the electric discharge; wherein the cathode is substantially cylindrical about a second axis which is parallel to the first axis, the protrusions being formed by grooves provided on the cylindrical surface of the cathode with the conductor wire being inserted in said grooves; and wherein the laser includes means for making the cathode rotate about the second axis.

Particular embodiments of the laser of the present invention are described hereinbelow by way of example with reference to the accompanying drawings in which.

Figure 1:
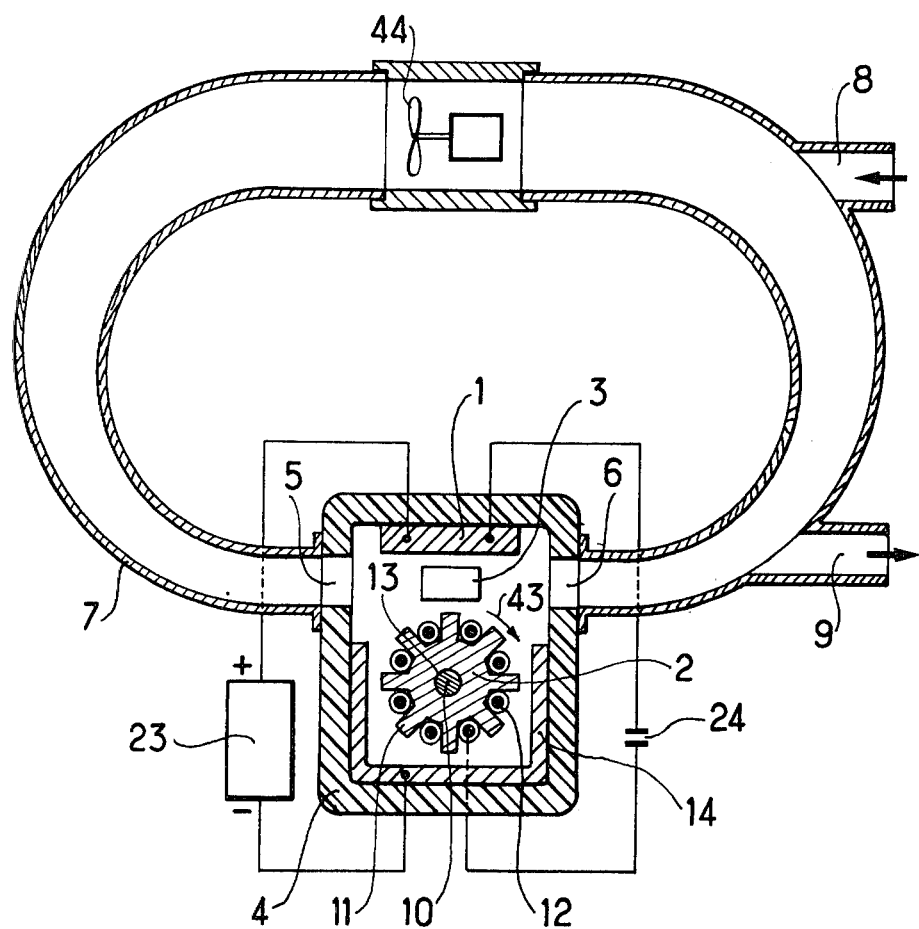
FIG. 1 illustrates a transverse cross-section of a first embodiment of a laser in accordance with the invention.

The gas laser illustrated in FIG. 1 principally comprises an anode 1, a cathode 2 which is disposed facing the anode and an active gas situated between the anode and the cathode and contained in an optical resonant cavity which is formed in a known way by two opposite reflectors only one of which, referenced 3, is shown in the figure. The reflectors of the cavity are fixed on the walls of a chamber 4 which surrounds the anode, the cathode and the active gas, one of these reflectors being partially transparent to allow the laser beam to pass through it. The chamber 4 has two openings 5 and 6 which communicate with a gas circulation circuit 7. Said circuit 7 has a gas outlet 9 and a gas inlet 8 connected to a tank, not shown, which contains a gas mixture including carbon dioxide.

The cathode 2 is substantially cylindrical about an axis 10 parallel with the axis of the cavity and includes protrusions such as 11 formed by grooves cut on the cylindrical surface of the cathode. In practice, the number of grooves is much higher than shown in the figure, and an insulated conductor wire 12 is inserted therein.

Figure 2:
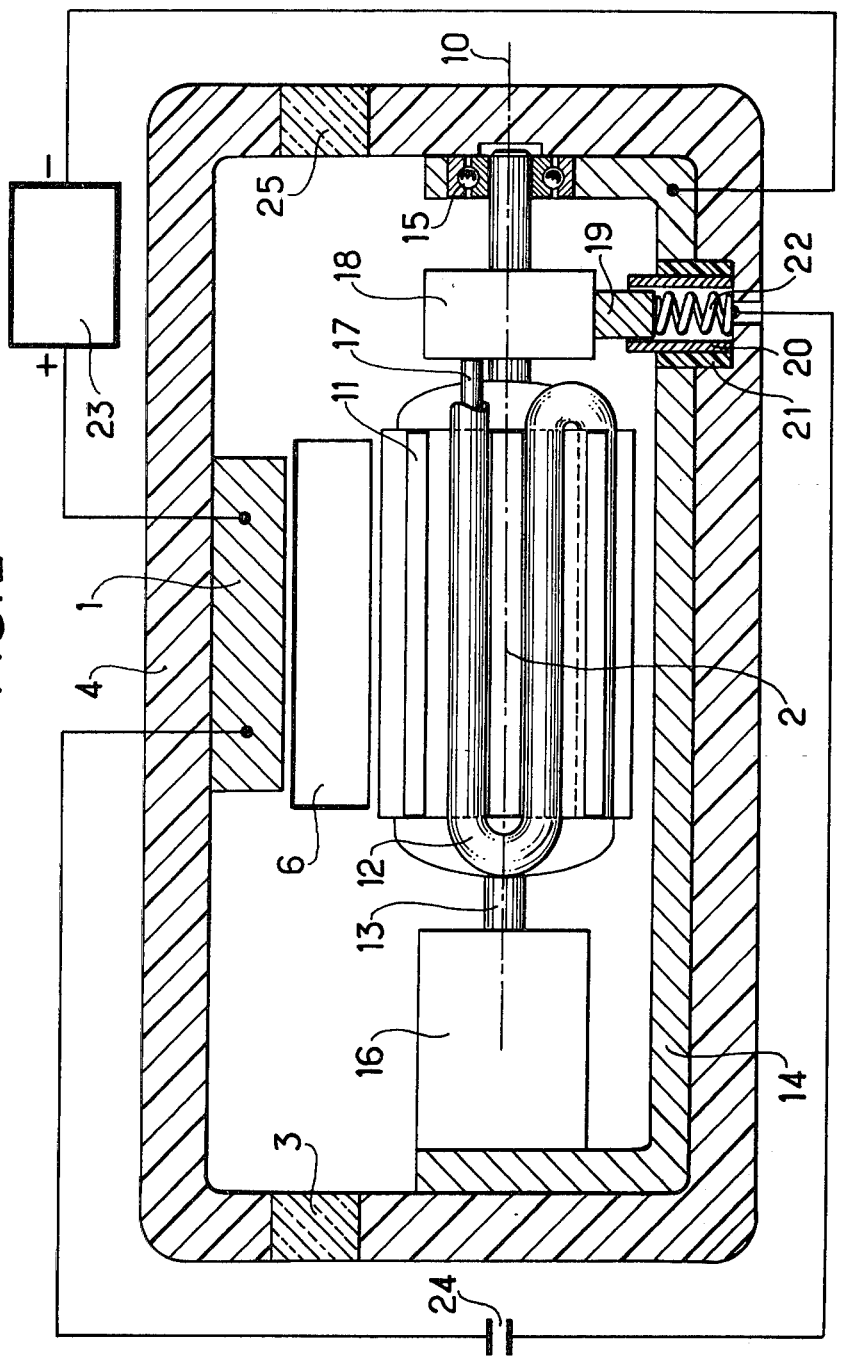
FIG. 2 is a longitudinal cross-section of the laser illustrated in FIG. 1.

As shown on a larger scale in FIG. 2, the cathode includes a shaft 13 which, by means of a bearing 15, is rotatably installed with respect to a metal support 14 fixed in the chamber 4. The shaft 13 of the cathode 2 is rotated about the axis 10 by a motor 16 fixed on the support 14. The grooves which form the protrusions 11 of the cathode 2 are parallel to the axis 10 and are regularly spaced out around the axis. The insulated conductor wire 12 is wound alternately in the successive grooves of the cathode so as to form a wave winding. One end 17 of the conductor 12 is connected to a conductive cylindrical ring 18 which is insulated from the shaft 13 and fixed coaxially thereon. A brush 19 installed in a brush carrier 20 fixed on the support 14 by an insulator 21 presses against the cylindrical surface of the ring due to the action of a spring 22.

An electrical pulse generator 23 includes a positive terminal connected to the anode 1 and a negative terminal connected to the cathode 2 by means of the metal support 14, the bearing 15 and the shaft 13. The brush 19 is linked to the anode 1 via a capacitor 24.

The gas laser described hereinabove and illustrated in FIGS. 1 and 2 operates as follows.

The mixture which contains carbon dioxide is injected at the inlet 8 of the circuit 7 and the motor 16 is started. The protrusions 11 of the cathode 2 which rotate around the axis 10 in the direction of the arrow 43 set up a ventilation effect sufficient to make the gas mixture circulate between the anode 1 and the cathode 2. By way of indication, the rotation speed of the cathode can be 60 r.p.m. If the speed of the gas circulation caused by the rotation of the protuberances is insufficient, a fan 44 is disposed inside the circuit 7.

The generator 23 is of the type whose terminals deliver a sequence of high-voltage pulses to cause successive electric discharges between the anode 1 and the cathode 2.

Each discharge excites the active gas so as to set up a laser pulse which leaves the cavity formed by the reflectors 3 and 25, the axis of the cavity being perpendicular to the direction of the discharge.

The electric conductor 12 is brought to a positive electric potential with respect to the cathode. Indeed, the capacitor 24 which is in series with the capacitance of the conductor 12 with respect to the cathode 2 forms a capacitance bridge, the positive electric potential to which the conductor 12 is brought depending on the capacitance of the capacitor 24. Of course, it is also possible to do without the capacitor 24 and to bring the conductor 12 to the potential of the anode 1 by direct connection between said conductor and the anode. The conductor 12 which is situated between the protrusions of the cathode and which is brought to a positive electric potential with respect to the cathode has the effect of initially ionizing the gas to make the discharge more uniform.

Due to the even spacing of the protrusions around the axis of the cathode and more especially due to the rotation of the cathode, heating of the cathode of the laser in accordance with the invention is greatly reduced with respect to that observed in lasers in accordance with the prior art. Indeed, any particular portion of the circumference of the cathode operates only during a fraction of the rotation period of the cathode and can therefore cool down during the remaining fraction. This reduction of the heating increases the service life of the cathode.

Further, in lasers in accordance with the invention, all other features remaining equal, a higher rate of laser pulse repetition and/or higher-power pulses can be provided. By way of indication, the repetition rate can reach 10,000 Hz.

Figure 3:
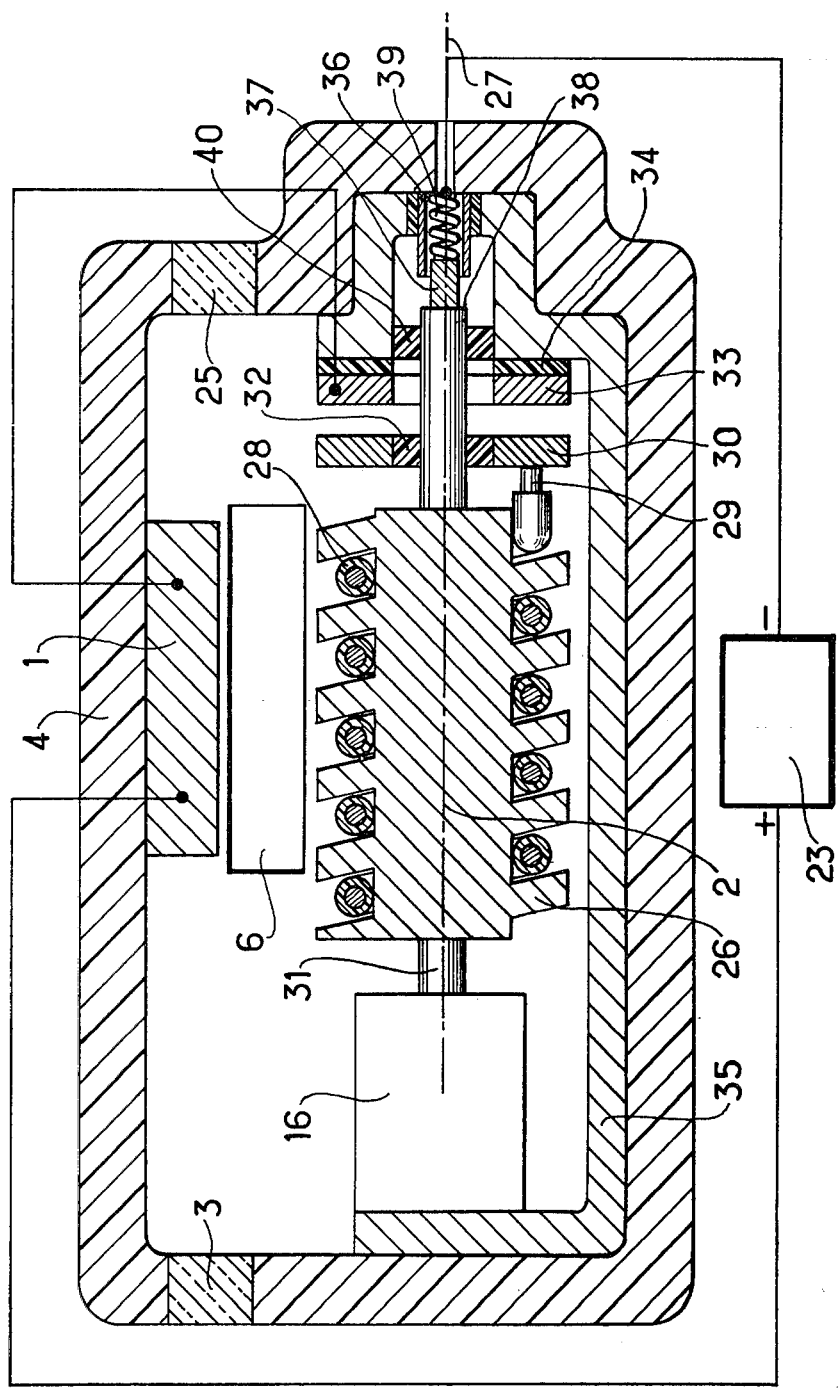
FIG. 3 is a longitudinal cross-section of a second embodiment of a gas laser in accordance with the invention.

FIG. 3 illustrates another embodiment of a gas laser in accordance with the invention. Said embodiment includes components which are common to that illustrated in FIG. 2 and which bear the same reference numerals.

In the laser illustrated in FIG. 3, the protrusions in the cathode are formed by a groove in a helical screw pitch configuration 26 in the cylindrical surface of the cathode and about the axis 27 thereof, the insulated electric conductor 28 being wound in said groove.

One end 29 of the conductor is connected to a rotating conductive disc 30 which is fixed coaxially on the shaft 31 of the cathode perpendicularly to the axis 27 via an insulating part 32. Another conductive disc 33 is fixed by means of insulation 34 on the support 35 about which the shaft 31 of the cathode rotates. The stationary disc 33 is disposed facing the rotating disc 30 so as to constitute a capacitor therewith. The stationary disc 33 is connected to the anode 1 by a connection which passes through the chamber 4. Here, the capacitor 30-33 performs the function of the capacitor 24 of the laser illustrated in FIG. 2.

The support 35 has a hole facing the plane surface of the end of the shaft 31. A brush holder 36, insulated from the support 35, is provided in said hole. A brush 37 can slide along the axis 27 in the brush holder 36 and is applied to the end surface 38 of the shaft 31 by a spring 39. The brush 37 is electrically connected to the negative terminal of the electric generator 23. The negative terminal is thereby connected to the cathode. The above disposition is used mainly when the support 35 is not electrically connected to the shaft 31, e.g. in the case illustrated in the figure where the shaft 31 rotates in an insulating bearing 40 fixed on the support 35.

The operation of the gas laser illustrated in FIG. 3 is identical to that of the laser illustrated in FIGS. 1 and 2.

Figure 4:
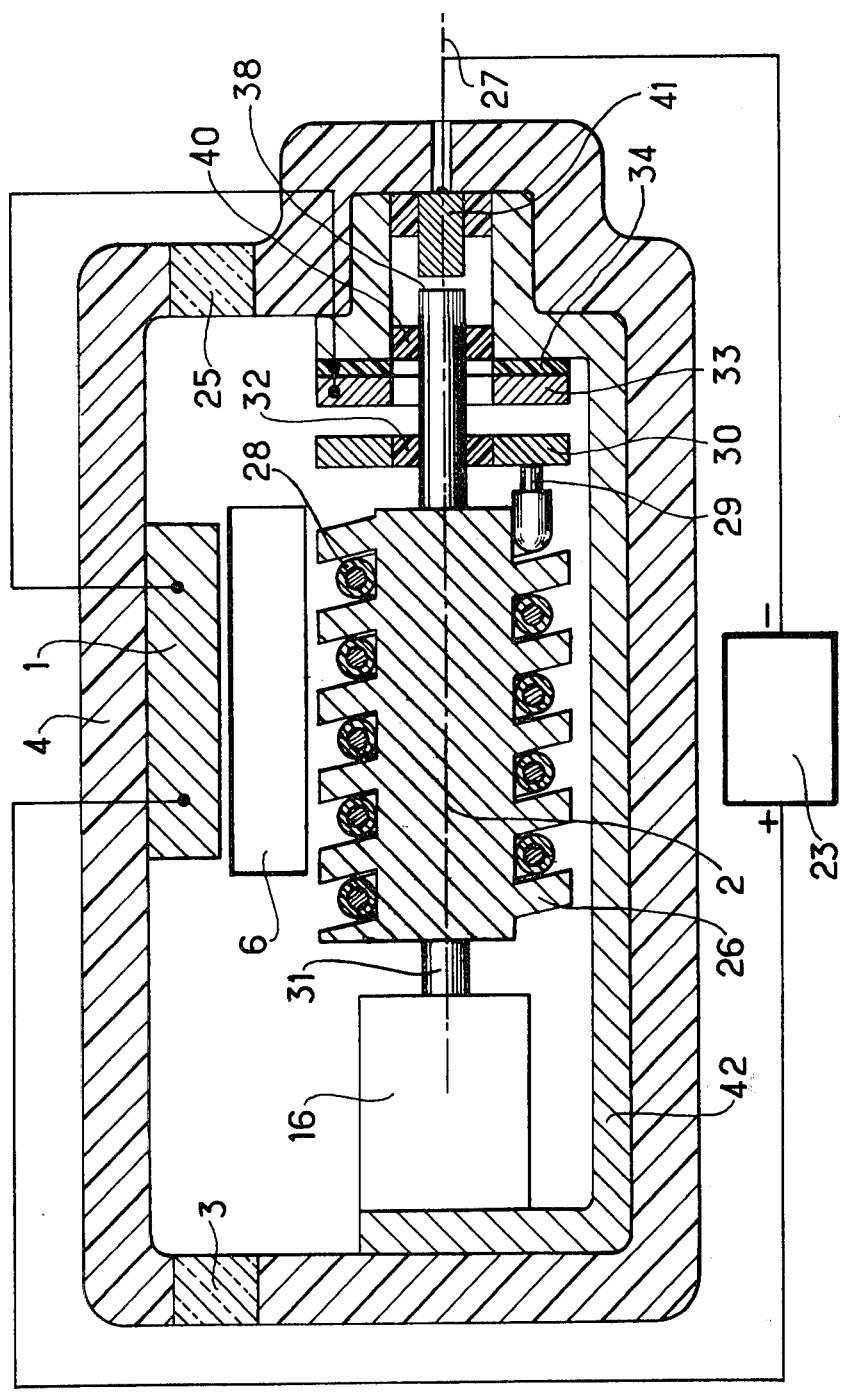
FIG. 4 is a longitudinal cross-section of a variant of the gas laser illustrated in FIG. 3.

FIG. 4 illustrates a variant of the laser illustrated in FIG. 3. In said variant, a conductive part 41 insulated from the support 42 of the cathode replaces the brush 37 of the laser illustrated in FIG. 3. The part 41 is disposed at a short distance from the end 38 of the shaft 31 so as to constitute a spark gap. The part is connected to the negative terminal of the generator 23. Said terminal is therefore connected to the rotating cathode.

Figure 5:
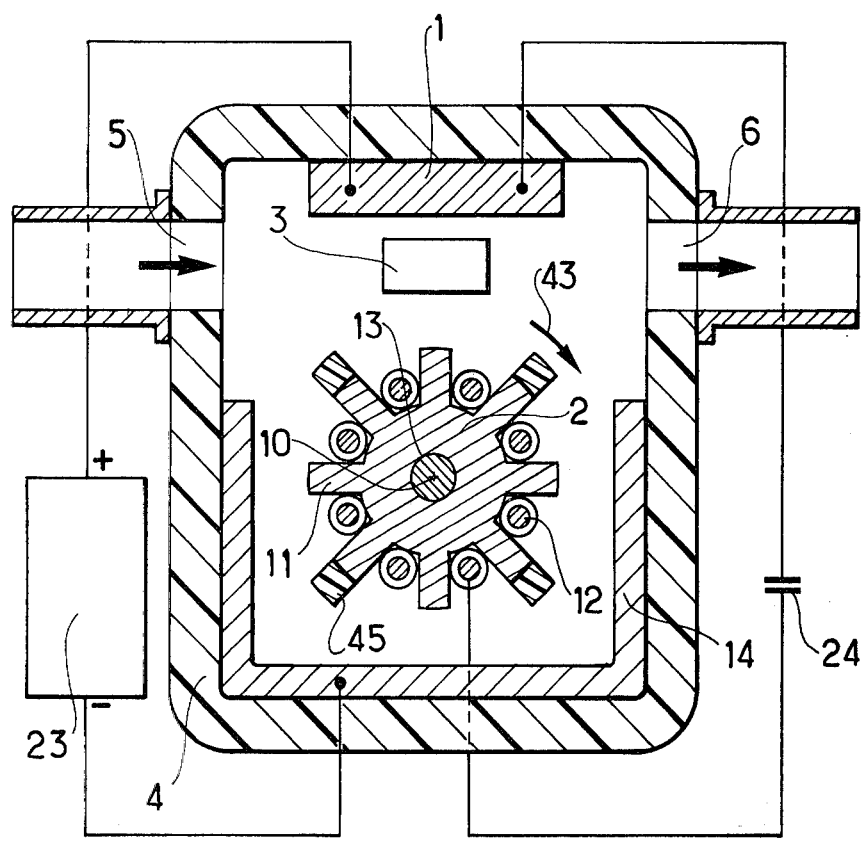
FIG. 5 is a transverse cross-section of a third embodiment of a gas laser in accordance with the invention.

FIG. 5 illustrates another embodiment of the laser illustrated in FIG. 1. Insulating fins 45 regularly spaced out around the axis 10 and extending radially beyond the cylindrical surface of the cathode are fixed on at least some of the protrusions 11. For example, as illustrated, every other protrusion may be provided with a fin. These fins reinforce the ventilation effect caused by the rotation of the cathode, so that it is generally possible to do without the fan, the ventilation circuit with the gas tank being connected directly to the inlet 5 of the chamber 4.

The gas laser in accordance with the invention can be applied for example to welding and to machining various substances, to range-finding or to infrared illumination of targets.

We claim:

1. A gas laser which includes:
   an anode;
   a cathode disposed facing the anode and leaving a space between the anode and the cathode, the cathode including protrusions between which an electrically insulated conductor wire is fixed, said wire being brought to a positive electric potential with respect to the cathode;
   means for setting up successive electric discharges between the anode and the cathode; and
   an optical resonant cavity containing an active gas and situated between the anode and the cathode, the cavity pointing in the direction of a first axis perpendicular to the direction of the electric discharge; wherein:
   the cathode is substantially cylindrical about a second axis which is parallel to the first axis, the protrusions being formed by grooves provided on the cylindrical surface of the cathode with the conductor wire being inserted in said grooves; and wherein the laser includes means for making the cathode rotate about the second axis.

2. A gas laser according to claim 1, wherein the grooves are parallel to the second axis and are regularly spaced out therearound.

3. A gas laser according to claim 2, wherein the longitudinal grooves of the cathode which rotate around the second axis also serve to cause the active gas to circulate through the space between the anode and the cathode.

4. A gas laser according to claim 2, including insulative fins fixed on at least part of the protrusions of the cathode, said fins being evenly spaced out around the second axis and extending radially beyond the cylindrical surface of the cathode.

5. A gas laser according to claim 1, wherein the grooves form a helical screw configuration on the cylindrical surface of the cathode and around the second axis.

6. A gas laser according to claim 1, wherein the cathode includes a shaft which, with respect to a stationary support, rotates on the second axis.

7. A gas laser according to claim 6, including a conductor ring fast with the shaft and connected to one end of the conductor wire and a first brush fast with the support and rubbing against the ring, said first brush being electrically connected to the anode.

8. A gas laser according to claim 7, wherein the brush is linked to the anode via a capacitor.

9. A gas laser according to claim 6, wherein the cathode includes a rotating disc fixed on the shaft perpendicularly to the second axis, said disc being symmetrical about the second axis and electrically connected to one end of the conductor wire and in that it also includes a stationary disc fast with the support and disposed facing the rotating disc so as to form a capacitor therewith, the stationary disc being electrically connected to the anode.

10. A gas laser according to claim 6, wherein the means for setting up successive electric discharges between the anode and the cathode include an electric pulse generator.

11. A gas laser according to claim 10, wherein the support is conductive and is electrically connected to the cathode, the negative terminal of the generator being connected to the support.

12. A gas laser according to claim 10, wherein the support includes a second brush which is insulated with respect to said support and which rubs against one end of the shaft, said second brush being connected to the negative terminal ot the generator.

13. A gas laser according to claim 10, wherein the support includes a conductive part which is insulated with respect to said support and is disposed at a short distance from one end of the shaft to constitute a spark gap, said conductive part being connected to the negative terminal of the generator.

* * * * *